United States Patent
Iwamura et al.

(10) Patent No.: US 8,155,681 B2
(45) Date of Patent: Apr. 10, 2012

(54) BASE STATION, MOBILE STATION, AND CELL DETERMINATION METHOD

(75) Inventors: Mikio Iwamura, Yokohama (JP); Minami Ishii, Yokohama (JP); Yasuhiro Kato, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 379 days.

(21) Appl. No.: 12/377,685

(22) PCT Filed: Aug. 14, 2007

(86) PCT No.: PCT/JP2007/065850
§ 371 (c)(1),
(2), (4) Date: Mar. 18, 2009

(87) PCT Pub. No.: WO2008/023609
PCT Pub. Date: Feb. 28, 2008

(65) Prior Publication Data
US 2010/0291956 A1 Nov. 18, 2010

(30) Foreign Application Priority Data
Aug. 22, 2006 (JP) .................. 2006-225920

(51) Int. Cl.
*H04B 7/00* (2006.01)
*H04B 17/00* (2006.01)
*H04B 1/38* (2006.01)

(52) U.S. Cl. ...... 455/509; 455/561; 455/436; 455/67.11

(58) Field of Classification Search .................. 455/509, 455/403, 405–409, 422.1–425, 432.1, 435.1–435.3, 455/436–445, 449–453, 458, 461, 466
See application file for complete search history.

(56) References Cited

U.S. PATENT DOCUMENTS

| | | | |
|---|---|---|---|
| 6,078,572 A * | 6/2000 | Tanno et al. | 370/335 |
| 6,418,136 B1 * | 7/2002 | Naor et al. | 370/347 |
| 2002/0119787 A1 * | 8/2002 | Hunzinger | 455/455 |
| 2003/0142651 A1 * | 7/2003 | Matta et al. | 370/338 |
| 2006/0183482 A1 * | 8/2006 | Ueda | 455/439 |

FOREIGN PATENT DOCUMENTS
JP 2006-5672 A 1/2006

OTHER PUBLICATIONS
International Search Report w/translation from PCT/JP2007/065850 dated Oct. 16, 2007 (2 pages).
Written Opinion from PCT/JP2007/065850 dated Oct. 16, 2007 (3 pages).

(Continued)

*Primary Examiner* — Ajit Patel
*Assistant Examiner* — Erica Navar
(74) *Attorney, Agent, or Firm* — Osha • Liang LLP

(57) ABSTRACT

One feature of the present invention relates to a base station for operating multiple cells each having a predefined bandwidth, including: a load measurement unit configured to measure traffic status in each of the cells; a selection probability computation unit configured to compute a selection probability used to select a preselected cell based on the traffic status, the preselected cell being accessed by a mobile station in transition from an idle state to an active state; a transmission unit configured to transmit the selection probability; and a control plane control unit configured to connect to the preselected cell being accessed by the mobile station.

10 Claims, 11 Drawing Sheets

OTHER PUBLICATIONS

3GPP TR 25.814 V7.0.0; "Physical layer aspects for evolved Universal Terrestrial Radio Access (UTRA)"; Jun. 2006 (126 pages).
3GPP TR 25.813 V7.0.0; "Radio interface protocol aspects"; Jun. 2006 (39 pages).
3GPP TS 25.304 V6.9.0; "User Equipment (UE) procedures in idle mode and procedures for cell reselection in connected mode"; Mar. 2006 (38 pages).
J. Laiho, et al.; "Radio Network Planning and Optimisation for UMTS"; John Wiley & Sons, Chichester, 2002, pp. 229-231 (3 pages).
3GPP TSG RAN WG2 #52; R2-060934; Load Sharing using Cell Reselection; T-Mobile; Mar. 27-31, 2006 (4 pages).

* cited by examiner

FIG.3
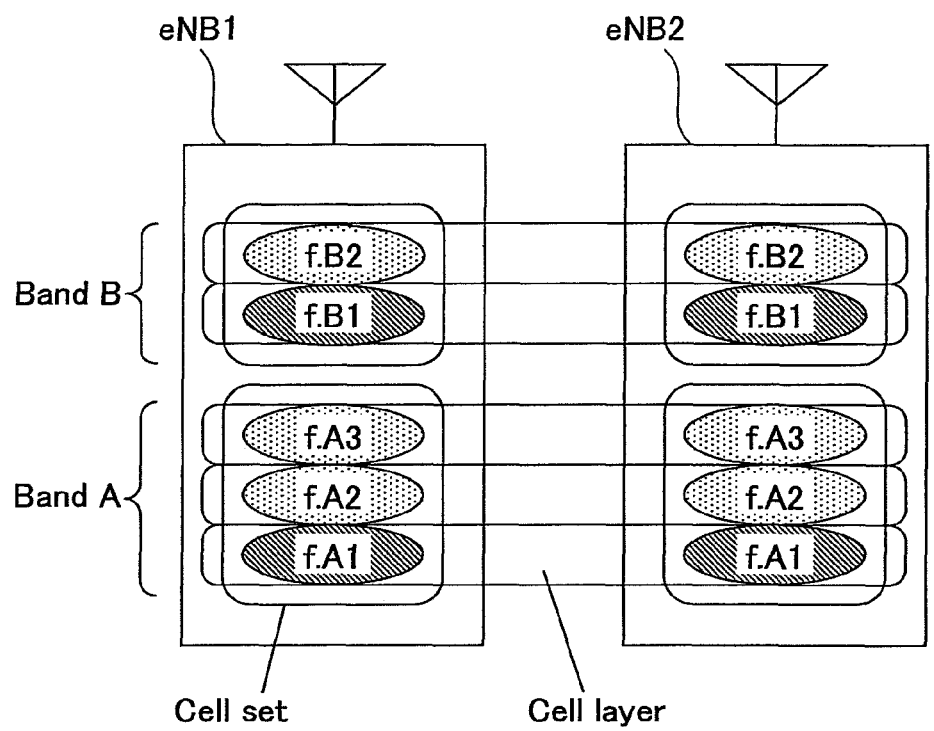
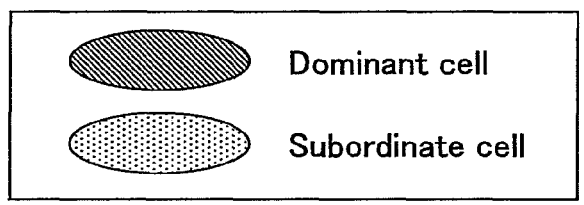

FIG.6

| Information element | | Range | Size | Remarks |
|---|---|---|---|---|
| Number of cell layers (n) | | [1-8] | 3 bit | |
| | Cell layer frequency code number | Enumerated [1.25, 2.5, 5, 10, 15, 20 MHz] | 16 bit | Similar to U-ARFCN |
| | Cell layer bandwidth | | 3 bit | Can be optional |
| | Selection (initial access) probability | [0-100 (127)] | 7 bit | Can be load level instead |
| Total | | | 26n+3 | = 81 (n=3), max 211 |

FIG.7

| Information element | | Range | Size | Remarks |
|---|---|---|---|---|
| Number of bands (m) | | [1-4] | 2 bit | |
| | Band indicator | Enumerated e.g., [800M, 1.5G, 1.7G, 1.9G, 2G, 2.5G, ...] | 4 bit | |
| | Band selection probability | [0-100 (127)] | 7 bit | Can be optional |
| | Number of cell layers (n) | [1-8] | 3 bit | |
| | Cell layer frequency code number | | 16 bit | Similar to U-ARFCN |
| | Cell layer bandwidth | Enumerated [1.25, 2.5, 5, 10, 15, 20 MHz] | 3 bit | Can be optional |
| | Selection (initial access) probability | [0-100 (127)] | 7 bit | Can be load level instead |
| Total | | | $\sum_{i=1}^{m}(26n_i+14)+2$ | $= 278$ ($n_i=3$, $m=3$), max 890 |

| Information element | Range | Size | Remarks |
|---|---|---|---|
| Number of bands (m) | [1-4] | 2 bit | |
| Band indicator | Enumerated e.g., [800M, 1.5G, 1.7G, 1.9G, 2G, 2.5G, ...] | 4 bit | |
| Band selection probability | [0-100 (127)] | 7 bit | Can be optional |
| Number of dominant cell layers (n) | [0-8] | 3 bit | |
| Cell layer frequency code number | | 16 bit | Similar to U-ARFCN |
| Cell layer bandwidth | Enumerated [1.25, 2.5, 5, 10, 15, 20 MHz] | 3 bit | Can be optional |
| Selection (camping) probability | [0-100 (127)] | 7 bit | Can be load level instead |
| Selection (initial access) probability | [0-100 (127)] | 7 bit | Can be load level instead |
| Number of subordinate cell layers (k) | [0-8] | 3 bit | |
| Cell layer frequency code number | | 16 bit | Similar to U-ARFCN |
| Cell layer bandwidth | Enumerated [1.25, 2.5, 5, 10, 15, 20 MHz] | 3 bit | Can be optional |
| Selection (initial access) probability | [0-100 (127)] | 7 bit | Can be load level instead |
| Total | | $\sum_{i=1}^{m}(33n_i+26k_i+17)+2 = 308$ ($n_i=1$, $k_i=2$, $m=3$), max 1958 | |

FIG.8

BASE STATION, MOBILE STATION, AND CELL DETERMINATION METHOD

TECHNICAL FIELD

The present invention generally relates to LTE (Long Term Evolution) systems and more particularly relates to base stations, mobile stations and cell determination methods.

BACKGROUND ART

As a next generation mobile communication system, a LTE (Long Term Evolution) system, which is a mobile communication system enabling data transmissions at 100 Mbps, has been intensively researched and developed.

Such a LTE system may be initially operated with a smaller number of carriers, as illustrated in FIG. 1. For example, the LTE system is initially operated with Band A. If the frequency band becomes insufficient after a few years, license for new Band B may be obtained, or another band used for a currently operated 3G system may be reassigned to the LTE system, so that the LTE system can be operated with Bands A and B. In addition, it is expected that the LTE system may be operated with Bands C and D in future. The term "band" used herein means a frequency band, such as 800 MHz band or 2 GHz band, where the LTE system is operated. Also, the term "carrier" used herein means a bandwidth for a system operated in a frequency band, and the demand may be that the carrier can correspond to any of 1.25 MHz, 2.5 MHz, 5 MHz, 10 MHz, 15 MHz and 20 MHz in the LTE system.

In this situation, there may initially exist only mobile stations or user equipment (UE) capable of transmission and reception in Band A (hereinafter referred to as "Band A capable UEs"), but mobile stations capable of transmission and reception in Bands A and B (hereinafter referred to as "Band A+B capable UEs") may be additionally provided after a few years. Even if Band B were newly introduced, the Band A capable UEs would not be able to use Band B for transmission and reception.

In the future, mobile stations capable of transmission and reception in Bands A, B, C and D (hereinafter referred to as "Band A+B+C+D capable UEs") may be additionally introduced. Thus, the same operator's network may be operated with multiple bands and multiple carriers, and different types of mobile stations with different transmission and reception capabilities may coexist.

If it comes to this situation, load balancing that can handle different transmission and reception capabilities of mobile stations may be required. For example, in a system operated with several bands and/or carriers, if mobile stations are concentrated in a certain carrier, the carrier may be intensively used for transmission and reception despite other bands and/or carriers being not fully used, resulting in degraded communication quality.

For the load balancing, there may be two types of load balancing schemes, traffic load balancing and camp load balancing. In the traffic load balancing, active users, that is, presently communicating users, may be uniformly distributed. In the camp load balancing, idle users, that is, users waiting for call, may be uniformly distributed.

For example, an article written by J. Laiho, A. Wacker and T. Novosad "Radio Network Planning and Optimisation for UMTS" (John Wiley & Sons, Chichester, 2002, p. 229-231) describes UMTS-GSM load balancing in conjunction with UMTS cell design.

Also, an article "Load sharing using cell reselection" (T-Mobile, R2-060934, TSG-RAN WG2 #52, Athens, Mar. 27-31, 2006) describes LTE-UMTS load balancing particularly for cases of where multiple operators share a network.

However, the load balancing has not been discussed from the viewpoint of separation between the traffic load balancing and the camp load balancing.

DISCLOSURE OF INVENTION

Problem to be Solved by the Invention

In the load balancing, 1) reduction in load of OAM (Operation and Management), 2) reduction in delay, for example, a time period for transition from IDLE to ACTIVE, 3) reduction in load of measurement of adjacent cells by mobile stations during waiting periods, and 4) reduction in signaling during waiting periods and others may be required.

Therefore, the present invention is intended to overcome at least one of the above-mentioned problems, that is, to address at least one of the above requirements. One object of the present invention is to provide a base station, a mobile station and a cell determination method that can reduce overhead of broadcast information and/or paging during operation of multiple carriers and shorten a time period required for transition from idle status to active status.

Means for Solving the Problem

In order to overcome the above problem, one feature of the present invention relates to a base station for operating multiple cells each having a predefined bandwidth, including: a load measurement unit configured to measure traffic status in each of the cells; a selection probability computation unit configured to compute a selection probability used to select a preselected cell based on the traffic status, the preselected cell being accessed by a mobile station in transition from an idle state to an active state; a transmission unit configured to transmit the selection probability; and a control plane control unit configured to connect to the preselected cell accessed by the mobile station.

According to this configuration, the mobile station can be caused to access a cell different from the waiting cell.

Another feature of the present invention relates to a mobile station, including: a cell selection unit configured to select a preselected cell based on selection probability, the preselected cell being accessed by the mobile station in transition from an idle state to an active state; and a control plane control unit configured to connect to the preselected cell selected by the cell selection unit, wherein the base station operates multiple cells each having a predefined bandwidth and broadcasts the selection probability used to select the preselected cell and computed based on traffic status in each of the cells.

According to this configuration, the mobile station can select a cell to be accessed in transition from an idle state to an active state based on the selection probability broadcast from the base station.

Another feature of the present invention relates to a method of determining a cell, including: measuring traffic status in multiple cells at a base station, each of the cells having a predefined bandwidth and being operated by the base station; computing a selection probability used to select a preselected cell at the base station based on the traffic status, the preselected cell being accessed by a mobile station in transition from an idle state to an active state; broadcasting the selection probability from the base station; selecting the preselected cell at the mobile station based on the selection probability; accessing the preselected cell from the mobile station; and connecting the mobile station to the preselected cell.

According to this configuration, the base station can cause the mobile station to access a cell different from the waiting cell. The mobile station can select and access a cell to be accessed in transition from an idle state to an active state based on the selection probability broadcast from the base station.

Advantage of the Invention

According to the embodiments of the present invention, it is possible to realize a base station, a mobile station and a cell determination method that can reduce overhead of broadcast information and/or paging during operation of multiple carriers and shorten a time period required for transition from idle status to active status.

BRIEF DESCRIPTION OF DRAWINGS

FIG. 3 is a schematic diagram illustrating cells, cell sets and cell layers;

FIG. 6 is a schematic diagram illustrating exemplary system information according to one embodiment of the present invention;

FIG. 7 is a schematic diagram illustrating exemplary system information according to one embodiment of the present invention;

FIG. 8 is a schematic diagram illustrating exemplary system information according to one embodiment of the present invention;

LIST OF REFERENCE SYMBOLS

Figure 1:
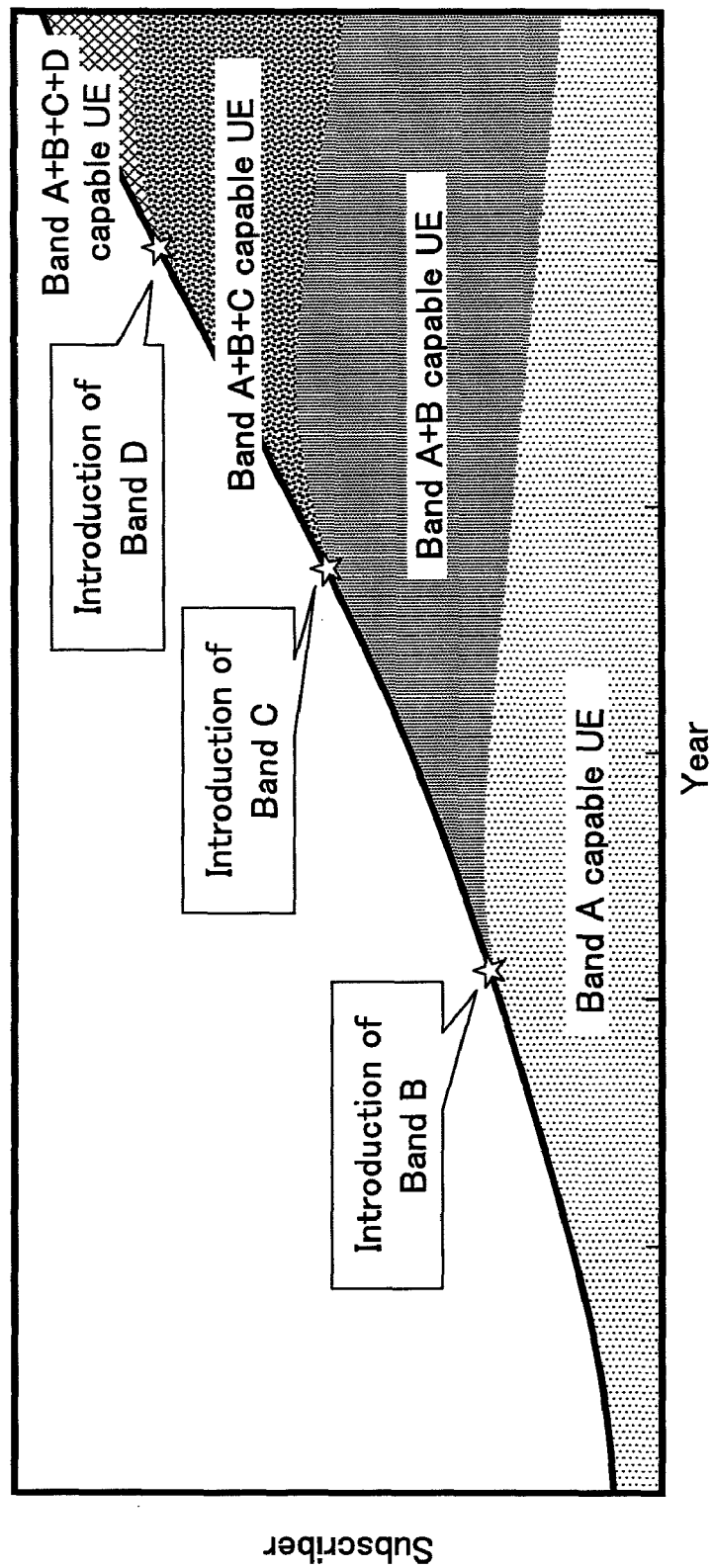
FIG. 1 is a schematic diagram illustrating increasing bands for use in a LTE system.

100: base station
102: transmission and reception unit
104: dominant cell processing unit
106, 114, 122, 202: RF circuit
108, 116, 124, 208: user plane processing unit
110, 118, 126: load measurement unit
109: load channel generation unit
112: broadcast channel generation unit
130: selection probability computation unit
132: control plane processing unit
134: network interface
200: mobile station
204: broadcast channel reception unit
210: user interface
212: reception quality measurement unit
214: camped cell reception quality measurement unit
216: preselected cell reception quality measurement unit
218: threshold determination unit
220: control unit
222: cell selection unit
224: UE capability storage unit
226: selected cell storage unit

BEST MODE FOR CARRYING OUT THE INVENTION

The best mode for carrying out the present invention is described with reference to the drawings in conjunction with embodiments as presented below.

Throughout all the drawings for illustrating the embodiments, the same reference symbols may be used for objects with the same function, and the objects may not be repeatedly described.

A mobile communication system including a base station and a mobile station according to one embodiment of the present invention is described with reference to FIG. 2.

In this embodiment, the mobile communication system includes a base station or eNode B (eNB) and a mobile station or user equipment (UE).

In the base station, an operator may operate several carriers, such as a 20 MHz carrier, a 10 MHz carrier and a 5 MHz carrier, in one or more bands. For example, a licensed frequency band may be operated in a LTE system. As mentioned above, the term "band" used herein means a frequency band for operating the LTE system and may be 800 MHz band or 2 GHz band, for example. Also, the term "carrier" means a bandwidth for a system operated in a frequency band, and the demand in the LTE system may be that the carrier can correspond to any of 1.25 MHz, 2.5 MHz, 5 MHz, 10 MHz, 15 MHz and 20 MHz. In other words, either of 1.25 MHz, 2.5 MHz, 5 MHz, 10 MHz, 15 MHz or 20 MHz may be selected as the bandwidth of one carrier.

Figure 2:
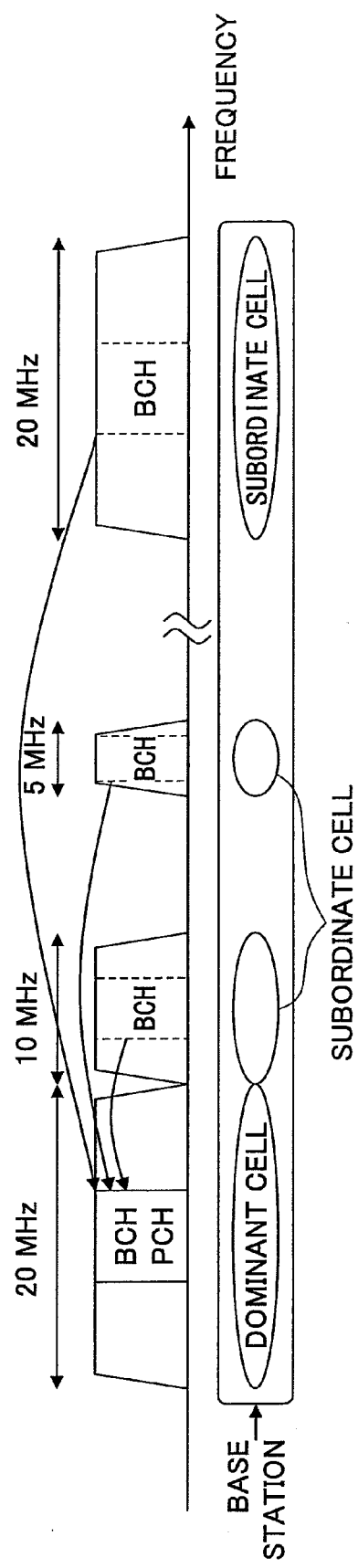
FIG. 2 is a schematic diagram illustrating an exemplary type of cell.

FIG. 2 illustrates one example where several carriers are operated in one band. In this example, two 20 MHz carriers, a 10 MHz carrier and a 5 MHz carrier are operated in one band. The carriers may be called cells.

In a certain carrier of the carriers operated in the band, for example, in only one 20 MHz carrier, a broadcast channel (BCH) for transmitting broadcast information and a paging channel for transmitting paging signals are transmitted. In the other carriers, the broadcast channel is transmitted without transmission of the paging channel, and only minimum information is transmitted in the broadcast channel. Such minimum information may include system frame number, dynamic persistence level for random access control and associated dominant cell carrier frequency code being information indicative of position of a carrier for transmitting the broadcast channel and the paging channel.

As mentioned above, the two types of carriers are provided for transmitting both the broadcast channel and the paging channel and for transmitting the minimum information in the broadcast channel without transmission of the paging channel. The two types of carriers (cells) are referred to as a dominant cell and a subordinate cell, respectively. In other words, the dominant cell allows a mobile station to not only wait in idle periods but also communicate in active periods and can transmit a synchronization channel, the broadcast channel, the paging channel and other channels. On the other hand, the subordinate cell does not allow a mobile station to wait in the idle periods but allows the mobile station to communicate in the active periods and can transmit the synchronization channel and the broadcast channel.

Also, a pair of cells included in the same band (frequency band) operated by the same base station are referred to as a cell set. The cell set includes at least one dominant cell. Also, the cell set may include one or more subordinate cells.

For example, as illustrated in FIG. 3, one base station (eNB1) is provided, and Band A and Band B are operated in the base station. Three carriers (cells) fA1, fA2 and fA3 are operated in Band A, and two carriers fB1 and fB2 are operated in Band B. For example, the carriers fA1, fA2, fA3, fB1 and fB2 may be 10 MHz. Alternatively, the carriers fA1, fA2, fA3, fB1 and fB2 may be 5 MHz or 20 MHz.

In FIG. 3, the carriers fA1 and fB1 are dominant cells. On the other hand, the carriers fA2, fA3 and fB2 are subordinate cells. Cells in the same Band A, that is, a set of the carriers fA1, fA2 and fA3, constitute one cell set, and cells in the same Band B, that is, a set of the carriers fB1 and fB2, constitute another cell set.

Also, the same operation is carried out in at least one base station, such as eNB2, provided at a location different from the base station eNB1, and if the dominant cells, the subordinate cells and the cell sets are defined in that base station, a set of cells in the same carrier are referred to as a cell layer. In other words, the cell layer includes cells having the same central frequency and bandwidth.

In FIG. 3, fA1, fA2, fA3, fB1 and fB2 operated in eNB1 are paired with fA1, fA2, fA3, fB1 and fB2 operated in eNB2, respectively, and the resulting pairs are referred to as cell layers.

Figure 4:
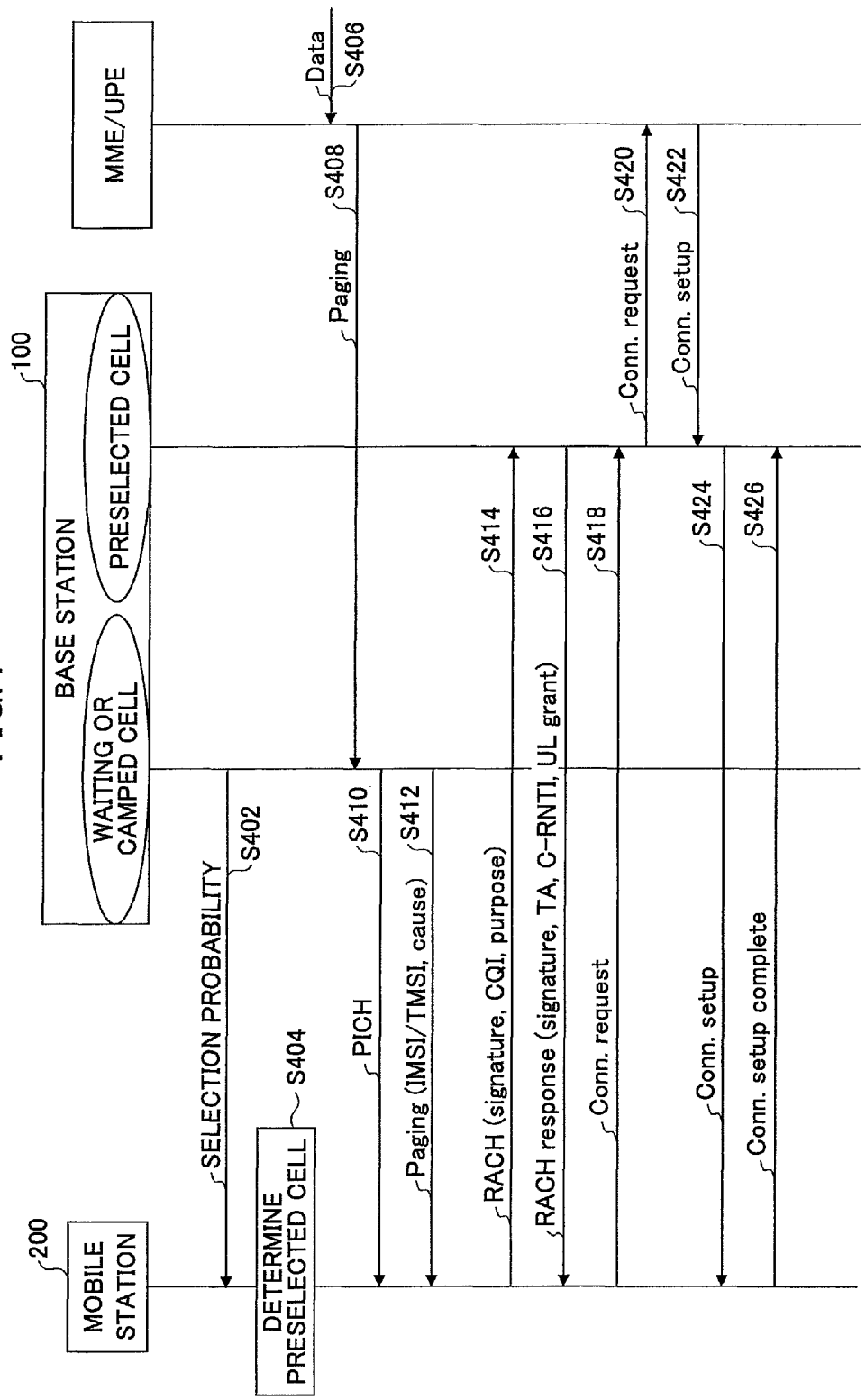
FIG. 4 is a flow diagram illustrating an exemplary operation of a mobile communication system according to one embodiment of the present invention.

Next, an exemplary operation of a mobile communication system according to this embodiment is described with reference to FIG. 4. This embodiment is described for the base station 100 that operates one dominant cell and one subordinate cell, but in other embodiments, several dominant cells and several subordinate cells may be operated by a base station.

In this embodiment, the mobile station 200 preselects a dominant cell waiting for calls as a waiting cell or a camped cell based on a selection probability as described below and transmits a random access channel. A dominant cell or a subordinate cell where an initial access is conducted is referred to as a preselected cell. The preselected cell may be also referred to as an accessing cell. In other embodiments, the mobile station 200 may select the waiting cell as the preselected cell, but in this embodiment, the waiting cell is different from the preselected cell.

At step S402, the base station 100 broadcasts a selection probability of the dominant cell and the subordinate cell. The selection probability is broadcast in only the dominant cell.

The mobile station 200 waits for calls in the waiting cell. The mobile station 200 receives broadcast information transmitted from the waiting cell and selects one cell for initial access, that is, the preselected cell, from the dominant cell and the subordinate cell in accordance with the selection probability in the broadcast information. In other words, the mobile station 200 receives the broadcast information from the waiting cell and preselects the cell for initial access (preselected cell) separately from the presently waiting cell based on the selection probability in the broadcast information. The waiting cell is selected from the dominant cell, and the initial access cell is selected from the dominant cell and the subordinate cell.

An exemplary operation at incoming call is described.

At step S406, data transmitted from a core network is buffered in an access gateway (aGW) serving as an upper station. If this access gateway is represented as a logical node, it may be called MME/UPE where the MME means a logical node for a control plane (C-Plane) and the UPE means a logical node for a user plane (U-Plane).

The MME calls the mobile station 200. Since the MME holds location registration information and knows which base station is to be paged, at step S408, the MME transmits a paging signal to that base station.

In the base station 100, the waiting cell pages the mobile station 200 based on the paging signal transmitted from the MME/UPE. For example, the waiting cell may transmit a paging indicator channel at step S410, and transmit a paging channel at step S412. The paging channel may include information indicative of "cause ID" indicative of communication types and IMSI/TMSI (International Mobile Subscriber Identifier/Temporary Mobile Subscriber Identifier).

Upon receiving the paging channel, the mobile station 200 determines whether the paging channel includes the global ID of the mobile station 200, that is, whether the IMSI/TMSI is included in the paging channel, and if so, at step S414, the mobile station 200 accesses the preselected cell in a RACH (Random Access Channel). Since the mobile station 200 preselects the cell to be accessed during idle status, the mobile station 200 knows the cell that the mobile station 200 is to access. In other words, the mobile station 200 accesses the preselected cell rather than the waiting cell. In this case, if the preselected cell is different from the waiting cell, the mobile station 200 accesses the preselected cell at a frequency different from the waiting cell.

Subsequently, a connection operation is performed between the mobile station 200 and the preselected cell.

Specifically, at step S414, the mobile station 200 transmits the RACH to the preselected cell. For example, the RACH may include a signature, a CQI (Channel Quality Indicator), purpose and other information.

At step S416, the preselected cell transmits a response to the RACH (RACH response) to the mobile station 200. For example, the RACH response may include a signature, a TA (Timing Advance), c-RNTI (Cell specific-Radio Network Temporary ID) and UL grant information.

A connection request is transmitted in an uplink based on the RACH response. In LTE, it is conceived that a shared channel may be used also in the uplink for scheduling. The base station 100 specifies a time frame, a frequency block and an information amount as the UL grant. The frequency block may be referred to as a resource block or in uplinks as a resource unit. Since a SC-FDMA (Single Carrier-Frequency Division Multiple Access) scheme is applied in the uplinks, resource units consisting of a predefined one of several subcarriers are provided, and a resource unit to be used is specified from the resource units.

The C-RNTI is an ID used in RAN to identify a mobile station.

The TA is described. The UL grant specifies a time frame and a frequency block transmitted in an uplink shared channel, but since propagation delay is different depending on location of mobile stations within a cell, transmission at the same timing may cause reception timing difference at the base station 100, which may result in overlap between time frames on the time axis. In order to accommodate reception timings within a predefined time frame, transmission timing must be adjusted. Information for adjusting the transmission timing is called the TA. The TA may be used in GSM systems, for example.

At step S418, the mobile station 200 transmits a connection request (Conn. request) to the preselected cell.

At step S420, the preselected cell transmits the Conn. request to the MME/UPE.

At step S422, the MME/UPE sets a connection based on the connection request. The MME/UPE transmits a connection setup (Conn. setup) to the preselected cell.

At step S424, the preselected cell transmits the connection setup to the mobile station 200.

At step S426, the mobile station 200 sets up the connection and transmits a connection setup completion (Conn. setup complete) indicative of completion of the connection setup to the preselected cell.

Among the above-mentioned steps, steps S414-S426 are simply illustrative and can be modified as needed except that the cell to be paged is different from the initial accessing cell. For example, step S424 may be performed without waiting for a response from the MME/UPE (step S422).

Next, an exemplary operation at outgoing call is described.

In this case, the above-mentioned steps subsequent to step S414 are performed. In other words, in response to an outgoing call manipulation, the mobile station 200 transmits the RACH to the preselected cell.

Next, an exemplary method of determining the selection probability broadcast by the waiting cell is described.

In the future, Band A capable UEs and Band A+B capable UEs may coexist. For example, it is assumed that the ratio of the number of Band A capable UEs to the number of Band A+B capable UEs is equal to 50:50. If the selection probability is not used, Band A capable UEs would select Band A whereas Band A+B capable UEs would select Band A and Band B with the ratio of 50:50. In this case, Band A and Band B would be selected with the ratio 75:25 in total and accordingly Band A would be selected with a higher probability, which is not preferable.

Thus, the selection probability may be determined based on the number of mobile stations in the marketplace for load balancing between Band A and Band B. For example, it is assumed that the ratio of the number of Band A capable UEs to the number of Band A+B capable UEs is equal to 40:60 and that uniform load balancing is adopted. The selection probability of Band A is denoted as $Pr_A$ while the selection probability of Band B is denoted as $Pr_B$. In this situation, by solving equations $Pr_B=1-Pr_A$ and $0.4+0.6Pr_A=0.6Pr_B$, it is derived that $Pr_A=17\%$ and $Pr_B=83\%$.

Thus, the load balancing is achieved by determining the selection probabilities of Band A and Band B to be equal to 17% and 83%, respectively, for Band A+B capable UEs.

Also, it is assumed that Band A includes cells A1 and A2 each having a 10 MHz bandwidth and Band B includes one cell having a 10 MHz bandwidth. Similarly, it is derived that $Pr_A=44\%$ and $Pr_B=56\%$. More specifically, it is derived that $Pr_{A1}=22\%$, $Pr_{A2}=22\%$ and $Pr_B=56\%$.

Once the selection probabilities are determined, they are available for a predefined time period.

Alternatively, the base station 100 may compute load statuses in the dominant cell and the subordinate cell and determine the selection probability based on the load statuses. In fact, the load status may be different for different cells and/or at different time points. The selection probability may be derived based on dynamically variable load.

For example, it is assumed that Band A includes two cells A1 and A2 and Band B includes one cell and that the ratio A1:A2:B=3:1:2 holds for the amount of remaining radio resources. In this case, it holds that $Pr_{A1}=33\%$, $Pr_{A2}=11\%$ and $Pr_B=56\%$.

Figure 5:
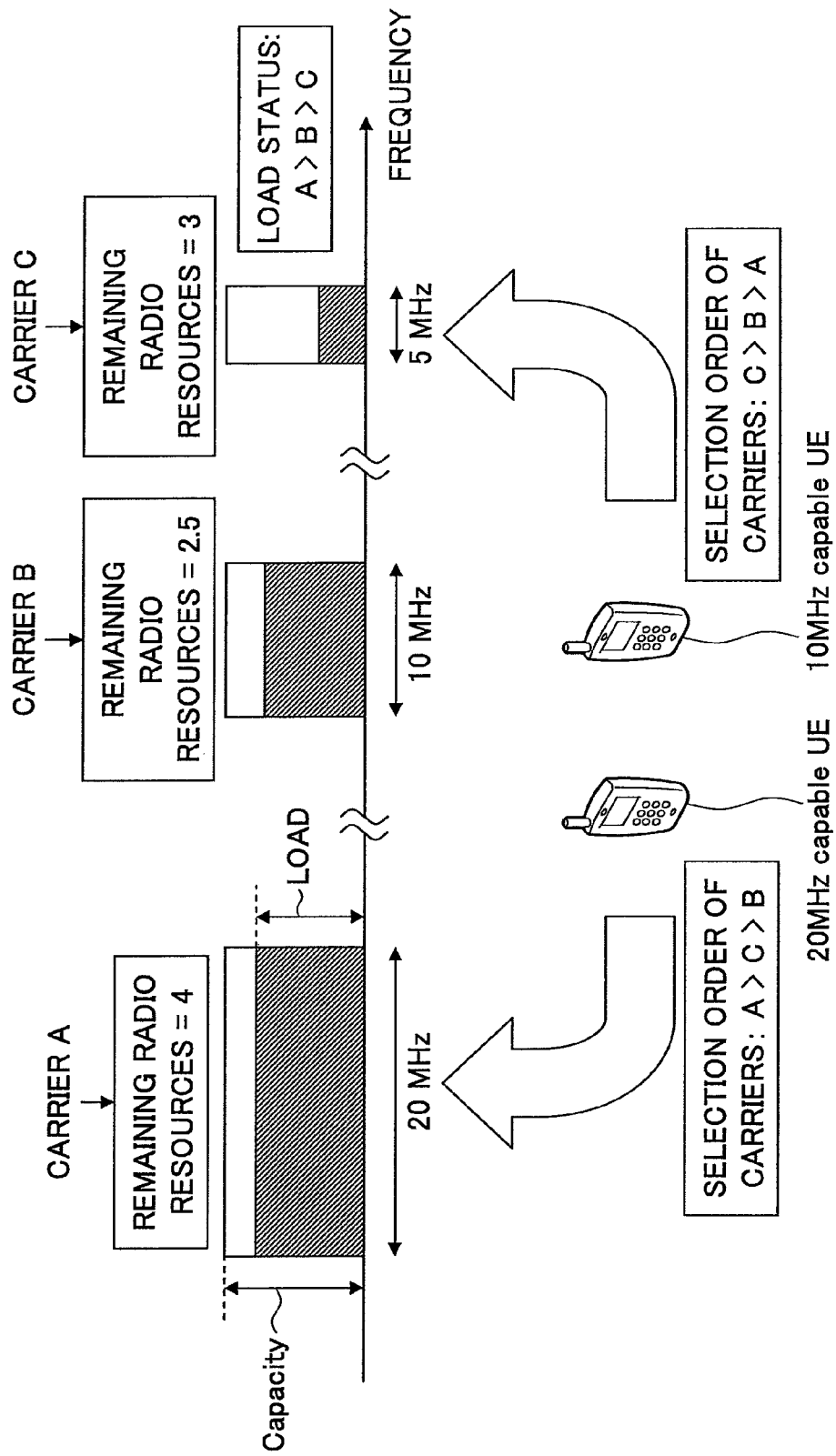
FIG. 5 is a schematic diagram illustrating an exemplary method of a preselected cell according to one embodiment of the present invention.

As illustrated in FIG. 5, an exemplary situation where carriers (cells) A, B and C are operated in a certain band and bandwidths of the cells A, B and C are equal to 20 MHz, 10 MHz and 5 MHz, respectively, is described. Also, it is assumed that the ratio of the remaining radio resources is cell A:cell B:cell C=4:2.5:3 and the load status is A>B>C.

A cell selected by the mobile station 200 under this situation is described.

In the LTE, the minimum transmission and reception capability of a mobile station is set to be 10 MHz. In the LTE, it is required that a system be applicable to bandwidths of 1.25 MHz, 2.5 MHz, 5 MHz, 10 MHz, 15 MHz and 20 MHz as the cell bandwidths as stated above. For example, if an operator is licensed for 20 MHz, the system is operated with the bandwidth of 20 MHz.

In this case, the mobile stations with the transmission and reception capability of 10 MHz can communicate without problems in cells operated in frequency bands less than or equal to 10 MHz, that is, in cells operated in frequency bands of 1.25 MHz, 2.5 MHz, 5 MHz and 10 MHz. However, these mobile stations would communicate in a cell operated in bandwidth of 20 MHz by using a portion of the frequency band of 20 MHz.

As a result, for the mobile stations with the transmission and reception capability of 20 MHz, it may be the best to select the carrier A. Although the carrier A is most congested, that is, the load status is the highest in the carrier A, four units of the remaining radio resources are available in the carrier A. Thus, assignment of the mobile stations to the carrier A could most greatly improve throughput. Then, the carrier C has the second largest amount of the remaining radio resources, and thus the carrier C may be next selected. Finally, the carrier B may be selected.

On the other hand, for mobile stations with the transmission and reception capability of 10 MHz, if the carrier A is selected, the remaining radio resources would be equal to 4 units. Since the carrier A is operated in the bandwidth of 20 MHz, only a half of the bandwidth can be used, and only 2 units of the remaining radio resources may be actually used. In this case, thus, it may be the best to select the carrier C. Then, since the carrier B has the second largest amount of the remaining radio resources, the carrier B may be next selected. Finally, the carrier A may be selected.

As mentioned above, a different cell may be selected under the same load status depending on the transmission and reception capability of a mobile station (10 MHz or 20 MHz).

Thus, in addition to the ratio of the mobile station capability, respective bandwidths supporting cells may be broadcast. In this case, information indicating that cell A=20 MHz, cell B=10 MHz and cell C=5 MHz may be transmitted.

The mobile station 200 could select the optimal cell through the broadcasting of the selection probability, the load status and the bandwidths of cells.

The broadcast information transmitted by the dominant cell (waiting cell) of the base station 100 together with the selection probability is described.

(1) Case where at least one dominant cell and the other subordinate cells exist within each band For example, this case may correspond to a case where a cell for transmitting an uplink signal for initial access is preselected for traffic load balancing.

In this case, as illustrated in FIG. 6, the number of cell layers, a cell layer frequency code number, a cell layer bandwidth and a selection (initial access) probability may be transmitted.

Here, the cell layer bandwidth does not have to be transmitted if all layers have the same bandwidth. Also, instead of the selection probability, the load level may be transmitted.

(2) Case where a collection of bands is considered as a single cell set

In this case, as illustrated in FIG. 7, the number of bands, a band indicator, a band selection probability, the number of cell layers, a cell layer frequency code number, a cell layer bandwidth and a selection (initial access) probability may be transmitted.

Here, the number of cell layers means the number of cell layers included in bands.

(3) Case where both the camp load balancing and the traffic load balancing are used For example, it is assumed that Band A includes cells A1, A2 and A3 and Band B includes cells B1 and B2. In this assumption, the cells A1 and B1 are dominant cells and the cells A2, A3 and B2 are subordinate cells. In this case, the camp load balancing must be performed between the cell A1 and the cell B1, and the traffic load balancing must be performed among the cells A1, A2, A3, B1 and B2. As a result, dominant cell information and subordinate cell information are transmitted.

In this case, as illustrated in FIG. 8, the number of bands, a band indicator, a band selection probability, the number of dominant cell layers, a cell layer frequency code number, a cell layer bandwidth, a selection (camping) probability together with a selection (initial access) probability, the number of subordinate cell layers, a cell layer frequency code number, a cell layer bandwidth and a selection (initial access) probability for a candidate cell for the preselected cell may be transmitted.

Next, exemplary movement of a mobile station that moves to a coverage area of another base station under determination of the waiting cell and the preselected cell is described with reference to FIG. 9.

In a 3G system, if multiple cells are present, a mobile station selects the waiting cell. When the mobile station moves, the mobile station updates the waiting cell with another cell.

As mentioned above, the waiting cell or camped cell means a cell where a paging channel is received. Also, an operation by the mobile station for selecting the waiting cell may be referred to as cell selection, and an operation by the mobile station for reselecting the waiting cell may be referred to as cell reselection.

Since propagation state may change instantaneously, it is the most efficient to wait in a cell with the best propagation state. In this case, however, the reselection may frequently occur, which may consume a battery unnecessarily. Thus, in the 3G system, a threshold S-criteria is used to prevent the reselection until reception level of a pilot signal transmitted from a base station covering the waiting cell falls below the S-criteria.

Figure 9:
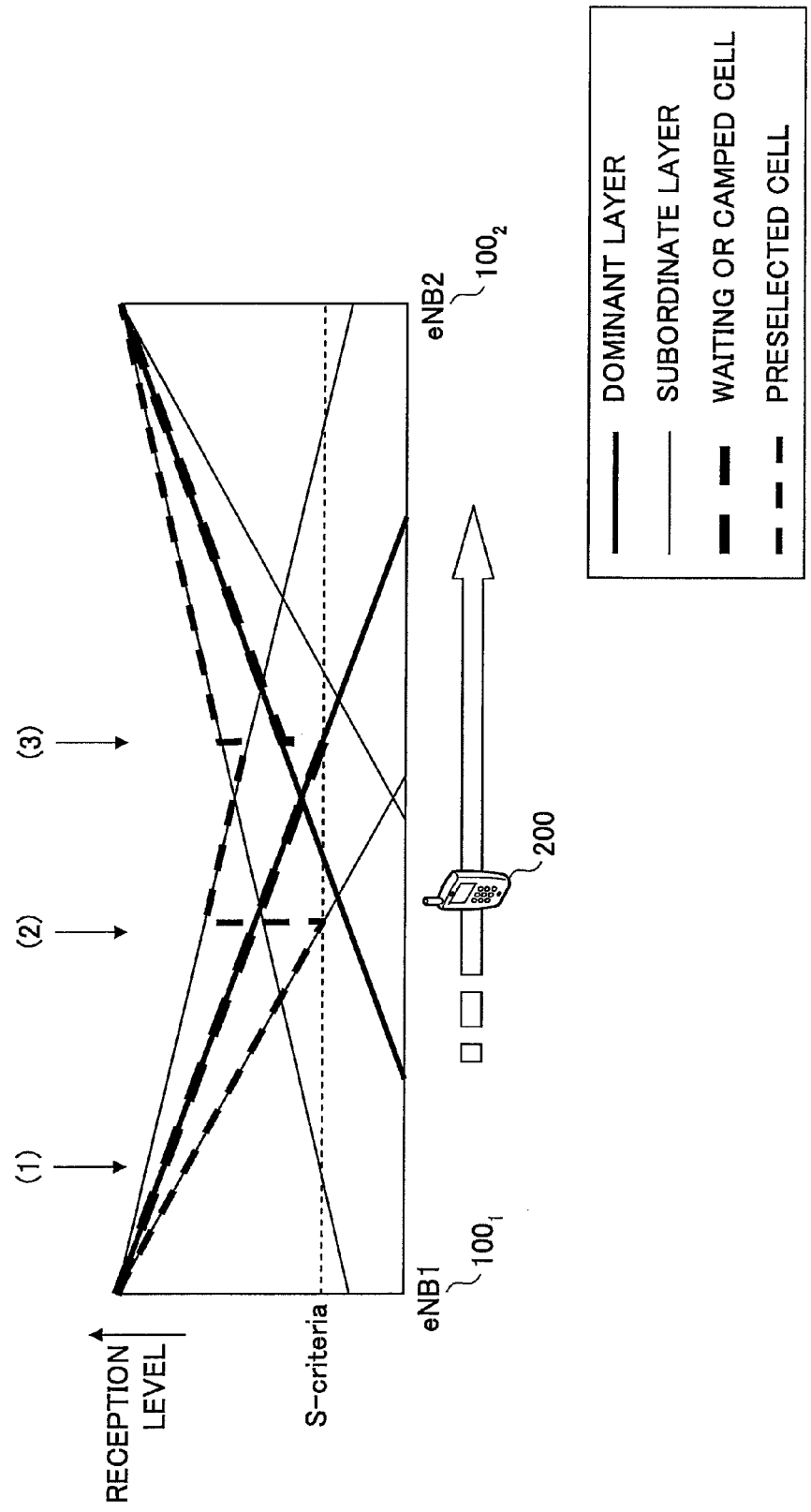
FIG. 9 is a schematic diagram illustrating exemplary reselection in a mobile station according to one embodiment of the present invention.

As illustrated in FIG. 9, base stations (eNB1) $100_1$ and (eNB2) $100_2$ are provided, and each of the base stations includes three cell layers, one of them being a dominant cell and the others being subordinate cells. Since the three cells have different frequencies, respective propagation states may differ from each other.

In the location (1), the mobile station 200 is waiting for calls in a dominant cell indicated in a dotted bold line. Also, the mobile station 200 sets a subordinate cell indicated in a dotted thin line as the preselected cell based on a selection probability.

Then, the mobile station 200 moves to the location (2), and reception quality of the preselected cell falls below a predefined threshold such as the S-criteria. If the reception quality further becomes worse, the resulting propagation state may disable initial access. In this case, the preselected cell must be reselected. In the reselection, another cell subordinate cell that is not set to the preselected cell may be reselected. Alternatively, the dominant cell may be reselected.

Furthermore, the mobile station 200 moves to the location (3), and the reception quality of the waiting cell falls below the predefined threshold such as the S-criteria. In this point, it is determined that the waiting cell must be changed. Then, the mobile station 200 measures reception quality of adjacent cells and switches to a base station covering a cell with the highest reception quality such as the base station (eNB2) $100_2$. In other words, the waiting cell is switched to the dominant cell of the base station (eNB) $100_2$.

Also, when the waiting cell is changed, the mobile station 200 changes the preselected cell. For example, the mobile station 200 may select the preselected cell based on broadcast information from the base station $100_2$. Alternatively, if the target cell has the same cell layer structure as the source cell, the mobile station 200 may switch to the same cell layer. In other words, if the central frequency and the bandwidth remain unchanged, a cell belonging to the same cell later may be reselected as the preselected cell. In this case, the selection probability may be changed. In this manner, the measurement of the preselected cell for reselection, that is, a frequency scanning operation can be omitted.

Also, if the waiting cell is changed, the reselection may be performed based on the selection probability included in broadcast information transmitted from the target base station. In this manner, it is possible to prevent the preselected cell from being biased to the dominant cell or the subordinate cell with a better propagation state.

In the 3G system, the S-criteria must be satisfied for only the waiting cell. In this embodiment, the reception quality must exceed the threshold for not only the waiting cell but also the preselected cell.

In this case, the threshold of the reception quality such as the S-criteria may have the same value or a different value for the waiting cell and the preselected cell. If different thresholds are used for the waiting cell and the preselected cell, the thresholds specific to layers may be set. In other embodiments, a threshold may be set for the waiting cell, and an offset may be set for the preselected cell based on the measured propagation state. The satisfiability may be determined based on a value derived from the threshold and the offset.

Figure 10:
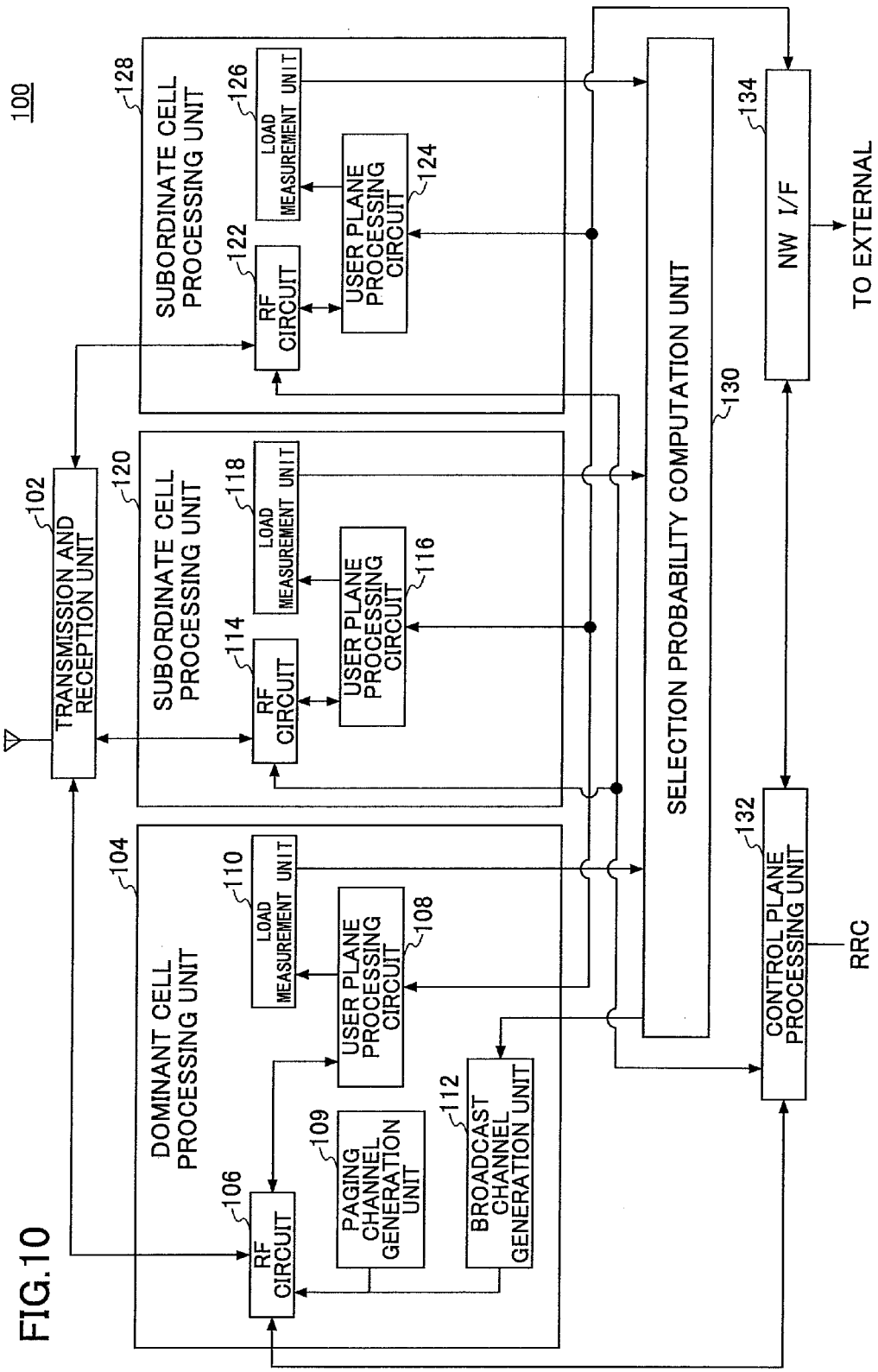
FIG. 10 is a partial block diagram illustrating a base station according to one embodiment of the present invention.

Next, an exemplary specific configuration of the base station 100 according to this embodiment is described with reference to FIG. 10.

This embodiment is described for the base station 100 that operates cells fA1, fA2 and fA3 in Band A, but the present invention can be applied to a base station that operates several bands or a base station that operates several cells (carriers) in each band. In the present embodiment, the cell fA1 is referred to as a dominant cell, and the cells fA2 and fA3 are referred to as subordinate cells.

The base station 100 includes a transmission and reception unit 102 with an antenna, a dominant cell processing unit 104, subordinate cell processing units 120, 128, a selection probability computation unit 130, a control plane processing unit 132 and a network interface 130. In the dominant cell processing unit 104 and the subordinate cell processing units 120, 128, carriers with the central frequency fA1, fA2 and fA3, respectively, are operated.

The dominant cell processing unit 104 includes a RF circuit 106, a user plane processing unit 108, a load measurement unit 110, a paging channel generation unit 109 and a broadcast channel generation unit 112.

The subordinate cell processing units 120, 128 includes RF circuits 114, 122, user plane processing units 116, 124 and load measurement units 118, 126, respectively.

The dominant cell processing unit 104 performs some operations on a waiting cell or camped cell where the mobile station 200 is waiting for calls and some operations on a preselected cell determined by the mobile station 200 depending on a selection probability.

The subordinate cell processing units 120, 128 perform some operations on the preselected cell determined by the mobile station 200 depending on a selection probability.

The user plane processing units 108, 116, 124 instruct the respective load measurement units 110, 118, 126 to measure load at a predefined time interval.

In response to the instructions from the user plane processing units 108, 116, 124, the load measurement units 110, 118, 126 measure the load and supply the results (load statuses) to the selection probability computation unit 130.

The selection probability computation unit 130 uses the above-mentioned method to compute the selection probability depending on the load statuses supplied from the load measurement units 110, 118, 126 and supplies it to the broadcast channel generation unit 112.

The broadcast channel generation unit 112 generates a broadcast channel including the supplied selection probability and supplies it to the RF circuit 106.

The RF circuit 106 transmits the supplied broadcast channel via the transmission and reception unit 102.

The paging channel generation unit 109 generates a paging indicator channel and a paging channel and supplies them to the RF circuit 106.

The RF circuit 106 transmits the supplied paging indicator channel and paging channel via the transmission and reception unit 102.

A RACH transmitted from the mobile station 200 is supplied to the control plane processing unit 132 via either the RF circuit 106 in the dominant cell processing unit 104, the RF circuit 114 in the subordinate cell processing unit 120 or the RF circuit 122 in the subordinate cell processing unit 128 depending on a cell selected as the preselected cell.

The control plane processing unit 132 performs RRC (Radio Resource Control) and MAC (Medium Access Control) operations. Specifically, the control plane processing unit 132 may perform some operations associated with steps S416, S420 and S424, for example, assign C-RNTI to mobile stations, specify TA and UL grant, transmit a connection request to the MME/UPE and/or transmit a connection setup to the mobile station 200.

Data transmitted from the mobile station 200 is received at the preselected cell where a connection has been set. For example, if a cell where the carrier frequency fA2 is operated is selected as the preselected cell, the data transmitted from the mobile station 200 is received at the RF circuit 114 via the transmission and reception unit 102 and supplied to the user plane processing unit 116.

The user plane processing unit 116 performs some operations on user data. For example, the received data is transmitted to a receiving (external) mobile station via the network interface 134. Also, for example, the user plane processing unit 116 may perform some operations such as buffering, segmentation, reassembling, encoding, decoding, retransmission, packet discarding, and flow control.

Figure 11:
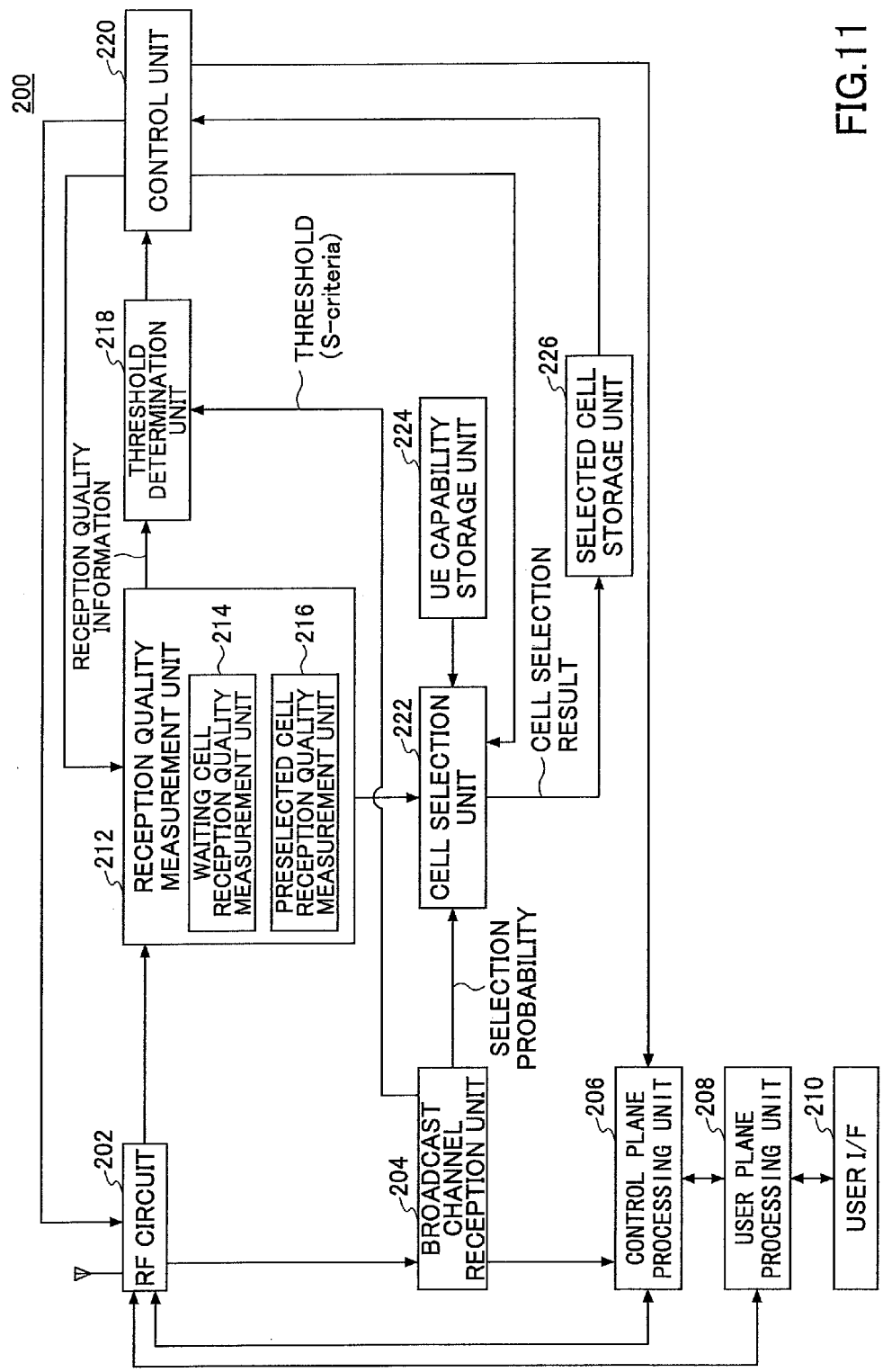
FIG. 11 is a partial block diagram illustrating a mobile station according to one embodiment of the present invention.

Next, an exemplary specific configuration of the mobile station 200 according to this embodiment is described with reference to FIG. 11.

The mobile station 200 includes a RF circuit 202, a broadcast channel reception unit 204, a control plane processing unit 206, a user plane processing unit 208, a user I/F 210, a reception quality measurement unit 212, a cell selection unit 222, a mobile station (UE) capability storage unit 224, a selected cell storage unit 226, a threshold determination unit 218 and a control unit 220. The reception quality measurement unit 212 includes a waiting cell reception quality measurement unit 214 and a preselected cell reception quality measurement unit 216.

A broadcast channel including a selection probability transmitted from the base station 100 is supplied to the broadcast channel reception unit 204 via the RF circuit 202.

The broadcast channel reception unit 204 extracts the selection probability from the broadcast channel and supplies it to the cell selection unit 222.

The cell selection unit 222 selects a preselected cell based on the selection probability. In this case, the cell selection unit 222 may select the preselected cell with reference to the UE capability storage unit 224 where capability of the mobile station 200 is stored. Also, if the broadcast channel transmitted from the base station 100 specifies a bandwidth supported by each cell, the cell selection unit 222 may select the preselected cell based on the bandwidth supported by the cell as mentioned above.

Alternatively, the cell selection unit 222 may select the preselected cell corresponding to services. For example, in reception of MBMS (Multimedia Broadcast/Multicast Service), a cell to which the MBMS is transmitted or other cells belonging to a band including the cell to which the MBMS is transmitted is selected as the preselected cell. For example, if the waiting cell is served by fA1 and the MBMS is provided by fB2, the cell selection unit 222 receives the MBMS. In addition, if the cell selection unit 222 selects fA2 and fA3 to use a unicast service concurrently, it would be difficult to receive the MBMS in fB2. Thus, the cell selection unit 222 may select fB1 or use the unicast service within the MBMS carrier in fB2.

Also, for example, users of VoIP (Voice over Internet Protocol) may be assigned to the same band/carrier. In the VoIP, small delay is required, and the VoIP has a feature of a low transmission rate. For these users, the same band/carrier may be selected for improved radio efficiency.

Also, for example, flexible services, that is, services available even if some delay occurs, such as a Web browsing service and a file downloading service, and inflexible services such as the VoIP and a streaming service may be balanced in all carriers for assignment.

Also, a cell with better coverage may be selected for a premium user. For example, for a cell operated in the 2 GHz band and a cell operated in the 800 MHz band, the cell operated in the 800 MHz may generally have better propagation conditions. Thus, the cell operated in the 800 MHz band may be selected for the premium users as the preselected cell.

Alternatively, the cell selection unit 222 may select the preselected cell based on traffic load. For example, the preselected cell may be selected based on the amount of the remaining resources and transmission power as mentioned above. Alternatively, for example, the preselected cell may be selected based on traffic load for each type of service as mentioned above.

Alternatively, the cell selection unit 222 may select the preselected cell based on traveling speed of the mobile station 200. For example, for fast moving mobile stations, a cell adjacent to a smaller number of cells and having a greater cell radius and broader coverage may be determined as the preselected cell. On the other hand, for slower moving mobile stations, a cell adjacent to a larger number of cells and having a smaller cell radius may be determined as the preselected cell.

The cell selection unit 222 stores information on the preselected cell, for example, information as described with reference to FIGS. 6-8, in the selected cell storage unit 226. Also, the selected cell storage unit 226 may store information on the waiting cell.

The control unit 220 sets a frequency based on the information stored in the selected cell storage unit 226. Also, as a result of determination by the threshold determination unit 218, if reselection of the waiting cell and/or the preselected cell becomes necessary, the control unit 220 causes the reception quality measurement unit 212 to search for and measure other cells. In addition, the control unit 220 controls the cell selection unit 222 to perform the reselection.

On the other hand, the broadcast channel reception unit 204 supplies information other than the selection probability to the control plane control unit 206. The control plane control unit 206 transmits a response to a paging channel, that is, a RACH to the preselected cell via the RF circuit 202 based on the supplied information. Then, the control plane control unit 206 sets a connection to the preselected cell.

The user plane control unit 208 performs some operations in accordance with the control plane control unit 206 and transmits data via the RF circuit 202. Also, the user plane control unit 208 receives data via the RF circuit 202.

Also, the reception quality measurement unit 212 periodically measures reception quality of a cell and supplies reception quality information to the threshold determination unit 218. Specifically, the waiting cell reception quality measurement unit 214 measures reception quality of the waiting cell, and the preselected cell reception quality measurement unit 216 measures reception quality of the preselected cell. Also, in response to instruction from the control unit 220, the reception quality measurement unit 212 searches for and measures other cells. The measurement result is delivered to the cell selection unit 222 to provide information for cell selection/reselection.

The threshold determination unit 218 compares the supplied reception quality to a predefined threshold such as S-criteria and determines whether the supplied reception quality is below the threshold. If the supplied reception quality is below the threshold, the threshold determination unit 218 informs the control unit 220 of it. When the control unit 220 is informed that the reception quality is below the threshold and further reception quality of the preselected cell is below a threshold, the control unit 220 specifies another cell with better reception quality as a new preselected cell. Also, if reception quality of the waiting cell is below a threshold, the control unit 220 specifies a dominant cell with better reception quality as a new waiting cell. Specifically, the control unit 220 supplies a command to cause the RF circuit to modify the frequency and search for adjacent cells.

In response to receipt of the frequency modification command, the RF circuit 202 modifies the frequency. The reception quality measurement unit 212 measures reception quality of the adjacent cells and supplies it to the cell selection unit 222. The cell selection unit 222 selects a waiting cell based on the selection probability and the reception quality and stores information on the waiting cell in the selected cell storage unit 226. The control unit 220 sets the frequency in the RF circuit 202 in accordance with the waiting cell information in the selected cell storage unit 226 and performs some operations on the control plane processing unit 206 such as indication of a bandwidth.

According to this embodiment, since a mobile station can determine a preselected cell for initial access based on the selection probability transmitted from a base station, it is possible to shorten delay in transition from idle state to active state under restriction of the waiting cell during operations with multiple carriers. In this manner, the waiting cell can be restricted, resulting in reduction in overhead of broadcast information and paging.

For convenience, the present invention has been described with reference to the distinct embodiments, but separation of the embodiments is not essential to the present invention and two or more of the embodiments may be used together as needed. Some specific numerals have been used to facilitate understanding of the present invention, but unless otherwise noted, these numerals are simply illustrative and any other appropriate values may be used.

The present invention has been described with reference to the specific embodiments of the present invention, but the embodiments are simply illustrative and variations, modifications, alterations and substitutions could be contrived by those skilled in the art. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2006-225920 filed on Aug. 22, 2006, the entire contents of which are hereby incorporated by reference.

INDUSTRIAL APPLICABILITY

A base station, a mobile station and a cell determination method according to the present invention can be applied to a radio communication system.

The invention claimed is:

1. A base station for operating multiple cells each having a predefined bandwidth, comprising:
    a selection probability computation unit configured to compute a selection probability used to select a preselected cell, wherein the preselected cell is to be initially accessed by a mobile station when the mobile station transitions from an idle state to an active state;
    a transmission unit configured to transmit the selection probability; and
    a control plane control unit configured to connect to the preselected cell accessed by the mobile station,
    wherein the mobile station:
        measures reception quality of a camping cell where the selection probability is broadcast and measures reception quality of the preselected cell,
        determines whether the reception quality of the camping cell satisfies a predefined threshold and whether the reception quality of the preselected cell satisfies the predefined threshold, and
        performs cell reselection if the reception quality of the camping cell does not satisfy the predefined threshold.

2. The base station as claimed in claim 1, wherein the selection probability computation unit is configured to compute the selection probability based on mobile station capability information indicative of at least one of a frequency band and a bandwidth that the mobile station is capable of handling.

3. The base station as claimed in claim 1, wherein the selection probability computation unit is configured to compute the selection probability based on a remaining radio resource in each of the cells.

4. A mobile station, comprising:
    a cell selection unit configured to select a preselected cell based on selection probability, wherein the preselected cell is to be initially accessed by the mobile station when the mobile station transitions from an idle state to an active state;

a reception quality measurement unit configured to measure reception quality of a camping cell where the selection probability is broadcast and reception quality of the preselected cell;

a threshold determination unit configured to determine whether the reception quality of the camping cell satisfies a predefined threshold and whether the reception quality of the preselected cell satisfies the predefined threshold; and a control plane control unit configured to connect to the preselected cell selected by the cell selection unit, wherein a base station operates multiple cells each having a predefined bandwidth and broadcasts the selection probability used to select the preselected cell, and the cell selection unit is configured to perform cell reselection if the reception quality of the camping cell does not satisfy the predefined threshold.

5. The mobile station as claimed in claim 4, wherein the multiple cells comprise a dominant cell where the mobile station is allowed to wait in the idle state and communicate in the active state and a subordinate cell where the mobile station is allowed to communicate in the active state, and the cell selection unit is configured to select the preselected cell among the dominant cell and the subordinate cell based on the selection probability broadcast from the dominant cell.

6. The mobile station as claimed in claim 4, wherein the cell selection unit is configured to select the camping cell and the preselected cell based on the selection probability.

7. The mobile station as claimed in claim 4, wherein the cell selection unit is configured to reselect the preselected cell if the reception quality of the preselected cell does not satisfy the predefined threshold.

8. The mobile station as claimed in claim 4, wherein the threshold associated with the reception quality of the camping cell is different from the threshold associated with the reception quality of the preselected cell.

9. The mobile station as claimed in claim 4, wherein the threshold associated with the reception quality of the preselected cell is a value resulting from addition of a predefined offset to the threshold associated with the reception quality of the camping cell.

10. A method of determining a cell, comprising:

computing a selection probability used to select a preselected cell at the base station, wherein the preselected cell is to be initially accessed by a mobile station when the mobile station transitions from an idle state to an active state;

broadcasting the selection probability from the base station;

measuring reception quality of a camping cell where the selection probability is broadcast and measuring reception quality of the preselected cell;

determining whether the reception quality of the camping cell satisfies a predefined threshold and whether the reception quality of the preselected cell satisfies the predefined threshold; and performing cell reselection if the reception quality of the camping cell does not satisfy the predefined threshold, wherein the cell reselection comprises:

selecting the preselected cell at the mobile station based on the selection probability;

accessing the preselected cell from the mobile station; and connecting the mobile station to the preselected cell.

* * * * *